United States Patent
Andreoli-Fang et al.

(10) Patent No.: US 11,483,101 B2
(45) Date of Patent: *Oct. 25, 2022

(54) UPLINK CHANNEL RESERVATION WITH CONFLICTING WIRELESS COMMUNICATIONS

(71) Applicant: CABLE TELEVISION LABORATORIES, INC., Louisville, CO (US)

(72) Inventors: Jennifer Andreoli-Fang, Boulder, CO (US); Alireza Babaei, Herndon, VA (US)

(73) Assignee: Cable Television Laboratories, Inc., Louisville, CO (US)

(*) Notice: Subject to any disclaimer, the term of this patent is extended or adjusted under 35 U.S.C. 154(b) by 94 days.

This patent is subject to a terminal disclaimer.

(21) Appl. No.: 16/450,343

(22) Filed: Jun. 24, 2019

(65) Prior Publication Data

US 2019/0312687 A1    Oct. 10, 2019

Related U.S. Application Data

(63) Continuation of application No. 15/154,960, filed on May 14, 2016, now Pat. No. 10,333,656.

(Continued)

(51) Int. Cl.
*H04L 1/18* (2006.01)
*H04L 1/00* (2006.01)
(Continued)

(52) U.S. Cl.
CPC .......... *H04L 1/1832* (2013.01); *H04L 1/0058* (2013.01); *H04L 1/0061* (2013.01);
(Continued)

(58) Field of Classification Search
CPC ... H04L 1/1832; H04L 1/0058; H04L 1/0061; H04L 1/08; H04L 1/1825; H04L 1/187;
(Continued)

(56) References Cited

U.S. PATENT DOCUMENTS 5,517,522 A    5/1996  Arweiler et al.
5,828,677 A   10/1998  Sayeed et al.
(Continued)

OTHER PUBLICATIONS

Hu et al. "Interference avoidance for in-device coexistence in 3GPP LTE-advanced: challenges and solutions," IEEE, pp. 60-67, 2012.
(Continued)

*Primary Examiner* — Walter J Divito
*Assistant Examiner* — Anthony Luo
(74) *Attorney, Agent, or Firm* — PdZ Patent Law, PLLC

(57) ABSTRACT

Systems and methods presented herein provide for channel reservation for a wireless telephony system operating in an RF band with a wireless system comprising a conflicting wireless technology. One method is operable with an eNodeB. The method includes assigning an ID (e.g., a pseudo-random number sequence, or "PN sequence") to a user equipment (UE) operating in the RF band, processing a scheduling request for uplink (UL) data from the UE, and granting a time and a frequency for the UE to transmit the UL data. The method also includes waiting until the UE performs a Listen Before Talk (LBT) operation to determine whether the granted time and frequency is occupied by another wireless system employing a different wireless technology. The method also includes transmitting the ID to the UE to reserve the granted time and frequency when unoccupied by the other wireless system, and processing the UL data from the UE.

16 Claims, 10 Drawing Sheets

Related U.S. Application Data

(60) Provisional application No. 62/161,443, filed on May 14, 2015.

(51) Int. Cl.

| | | |
|---|---|---|
| *H04L 1/08* | (2006.01) | |
| *H04L 5/00* | (2006.01) | |
| *H04W 72/12* | (2009.01) | |
| *H04W 72/14* | (2009.01) | |
| *H04W 74/00* | (2009.01) | |
| *H04W 74/08* | (2009.01) | |
| *H04W 84/04* | (2009.01) | |
| *H04W 88/06* | (2009.01) | |

(52) U.S. Cl.
CPC ............... *H04L 1/08* (2013.01); *H04L 1/187* (2013.01); *H04L 1/1825* (2013.01); *H04L 1/1893* (2013.01); *H04L 5/0055* (2013.01); *H04W 72/1284* (2013.01); *H04W 72/14* (2013.01); *H04W 74/006* (2013.01); *H04W 74/08* (2013.01); *H04W 84/042* (2013.01); *H04W 88/06* (2013.01)

(58) Field of Classification Search
CPC ............... H04L 1/1893; H04L 5/0055; H04W 72/1284; H04W 72/14; H04W 74/006; H04W 74/08; H04W 84/042; H04W 88/06
See application file for complete search history.

(56) References Cited

U.S. PATENT DOCUMENTS

| | | | |
|---|---|---|---|
| 6,731,694 B2 | 5/2004 | Bozeki et al. | |
| 6,754,506 B2 | 6/2004 | Chang et al. | |
| 6,977,888 B1 | 12/2005 | Frenger et al. | |
| 7,907,512 B1 | 3/2011 | Embse | |
| 8,423,033 B1 | 4/2013 | Everson et al. | |
| 8,908,605 B1 | 12/2014 | Oroskar | |
| 9,479,940 B2 | 10/2016 | Padden et al. | |
| 9,559,728 B2 | 1/2017 | Babaei et al. | |
| 9,730,196 B2 | 8/2017 | Hamzeh et al. | |
| 10,091,769 B2 | 10/2018 | Campos et al. | |
| 10,122,494 B2 | 11/2018 | Babaei et al. | |
| 2003/0135794 A1 | 7/2003 | Longwell et al. | |
| 2005/0036727 A1 | 2/2005 | Wijngaarden et al. | |
| 2006/0112237 A1 | 5/2006 | Chen et al. | |
| 2006/0239230 A1 | 10/2006 | Nakano | |
| 2007/0072645 A1 | 3/2007 | Clark et al. | |
| 2007/0237117 A1 | 10/2007 | Moon et al. | |
| 2007/0263587 A1 | 11/2007 | Savoor et al. | |
| 2008/0102880 A1 | 5/2008 | Gholmieh et al. | |
| 2008/0119195 A1 | 5/2008 | Hansson et al. | |
| 2008/0187059 A1 | 8/2008 | Sood | |
| 2008/0219213 A1 | 9/2008 | Natarajan et al. | |
| 2008/0298238 A1 | 12/2008 | Dawson et al. | |
| 2008/0317162 A1 | 12/2008 | Roh et al. | |
| 2009/0059856 A1 | 3/2009 | Kermoal et al. | |
| 2009/0238090 A1 | 9/2009 | Sambhwani et al. | |
| 2009/0268692 A1 | 10/2009 | Haartsen et al. | |
| 2010/0069080 A1 | 3/2010 | Benveniste | |
| 2010/0178919 A1* | 7/2010 | Deepak ................ H04W 48/16 455/435.2 |
| 2010/0210214 A1 | 8/2010 | Pawar et al. | |
| 2010/0220676 A1 | 9/2010 | Grandblaise et al. | |
| 2010/0271263 A1 | 10/2010 | Moslifeghi | |
| 2010/0304779 A1 | 12/2010 | Andrews et al. | |
| 2010/0329118 A1 | 12/2010 | Adams | |
| 2011/0103343 A1 | 5/2011 | Nishio et al. | |
| 2011/0150505 A1 | 6/2011 | Roberts et al. | |
| 2011/0246862 A1 | 10/2011 | Graef | |
| 2011/0255514 A1 | 10/2011 | Olofsson et al. | |
| 2011/0286433 A1 | 11/2011 | Xiao et al. | |
| 2012/0033645 A1 | 2/2012 | Mantravadi et al. | |
| 2012/0058742 A1 | 3/2012 | Razoumov et al. | |
| 2012/0159220 A1 | 6/2012 | Winkler et al. | |
| 2012/0164948 A1 | 6/2012 | Narasimha et al. | |
| 2012/0178483 A1 | 7/2012 | Rosenau | |
| 2012/0213116 A1 | 8/2012 | Koo et al. | |
| 2012/0238301 A1 | 9/2012 | Morrison | |
| 2013/0028201 A1 | 1/2013 | Koo et al. | |
| 2013/0028223 A1 | 1/2013 | Kim et al. | |
| 2013/0083743 A1 | 4/2013 | Koo et al. | |
| 2013/0090124 A1 | 4/2013 | Panchai et al. | |
| 2013/0095760 A1 | 4/2013 | Thota et al. | |
| 2013/0148638 A1 | 6/2013 | Xing et al. | |
| 2013/0176953 A1 | 7/2013 | Stern-Berkowitz et al. | |
| 2013/0178219 A1 | 7/2013 | Lee et al. | |
| 2013/0201864 A1 | 8/2013 | Acharya et al. | |
| 2013/0208587 A1 | 8/2013 | Bala et al. | |
| 2013/0242907 A1 | 9/2013 | Kang et al. | |
| 2013/0265916 A1 | 10/2013 | Zhu et al. | |
| 2013/0272260 A1 | 10/2013 | Bitran et al. | |
| 2013/0273857 A1 | 10/2013 | Zhang et al. | |
| 2013/0322367 A1 | 12/2013 | Kang et al. | |
| 2014/0038657 A1 | 2/2014 | Jo et al. | |
| 2014/0050206 A1 | 2/2014 | Seo et al. | |
| 2014/0056204 A1 | 2/2014 | Suh et al. | |
| 2014/0080534 A1 | 3/2014 | Farhadi et al. | |
| 2014/0086175 A1 | 3/2014 | Hakola et al. | |
| 2014/0092765 A1 | 4/2014 | Agarwal et al. | |
| 2014/0098734 A1 | 4/2014 | Kalhan et al. | |
| 2014/0115279 A1 | 4/2014 | Chirca et al. | |
| 2014/0128088 A1 | 5/2014 | Farhadi | |
| 2014/0148165 A1 | 5/2014 | Serravalle et al. | |
| 2014/0161021 A1 | 6/2014 | Goldhamer | |
| 2014/0169368 A1 | 6/2014 | Grover et al. | |
| 2014/0269368 A1 | 9/2014 | Xu et al. | |
| 2014/0269484 A1 | 9/2014 | Dankberg et al. | |
| 2014/0349704 A1 | 11/2014 | Xiao et al. | |
| 2014/0362750 A1 | 12/2014 | Song et al. | |
| 2015/0003469 A1 | 1/2015 | Martinez | |
| 2015/0016441 A1 | 1/2015 | Hanson et al. | |
| 2015/0017999 A1 | 1/2015 | Chen et al. | |
| 2015/0023184 A1* | 1/2015 | Cili ................ H04W 48/16 370/252 |
| 2015/0085683 A1 | 3/2015 | Sadek et al. | |
| 2015/0146686 A1 | 5/2015 | Huang et al. | |
| 2015/0163767 A1 | 6/2015 | Shaw et al. | |
| 2015/0163805 A1 | 6/2015 | Cattoni et al. | |
| 2015/0208263 A1 | 7/2015 | Behravan et al. | |
| 2015/0223069 A1 | 8/2015 | Solondz | |
| 2015/0245232 A1 | 8/2015 | Luo et al. | |
| 2015/0245365 A1 | 8/2015 | Isokangas et al. | |
| 2015/0264582 A1 | 9/2015 | Brighenti et al. | |
| 2015/0270925 A1 | 9/2015 | Lin et al. | |
| 2015/0271681 A1 | 9/2015 | Perez et al. | |
| 2015/0289293 A1 | 10/2015 | Zhang et al. | |
| 2016/0037536 A1 | 2/2016 | Hamzeh et al. | |
| 2016/0135055 A1* | 5/2016 | Bhorkar ............ H04W 72/042 455/454 |
| 2016/0173369 A1* | 6/2016 | Chiba ................ H04L 61/2069 370/390 |
| 2016/0227578 A1 | 8/2016 | Lee et al. | |
| 2016/0270118 A1* | 9/2016 | He ................ H04W 74/06 |
| 2016/0295633 A1* | 10/2016 | Baligh ................ H04W 76/25 |
| 2016/0302225 A1* | 10/2016 | Damnjanovic ....... H04W 74/02 |
| 2017/0374612 A1* | 12/2017 | Stojanovski .......... H04W 60/04 |
| 2018/0027444 A1* | 1/2018 | Maria ............ H04W 28/0289 370/235 |
| 2018/0337748 A1 | 11/2018 | Hamzeh et al. | |
| 2019/0074927 A1 | 3/2019 | Babaei et al. | |

OTHER PUBLICATIONS

Wong, D et al., "Wireless Broadband Networks" [online] Mar. 2009; http://www.wiley.com/WileyCDS/WileyTitle/produceCd-

(56) References Cited

OTHER PUBLICATIONS 047018177X.html. Chapter 11, pp. 404-408, ISBN: 978-0-470-18177-5.

* cited by examiner

| QCI | Resource Type | Priority | Packet Delay Budget (ms) | Packet Error Loss Rate | Services |
|---|---|---|---|---|---|
| 1 | GBR | 2 | 100 | $10^{-2}$ | Conversational voice |
| 2 | GBR | 4 | 150 | $10^{-3}$ | Conversational voice (live streaming) |
| 3 | GBR | 5 | 300 | $10^{-6}$ | Non-Conversational video (buffered streaming) |
| 4 | GBR | 3 | 50 | $10^{-3}$ | Real-time gaming |
| 5 | Non-GBR | 1 | 100 | $10^{-6}$ | IMS signaling |
| 6 | Non-GBR | 7 | 100 | $10^{-3}$ | Voice, video (live streaming), interactive gaming |
| 7 | Non-GBR | 6 | 300 | $10^{-6}$ | Video (buffered streaming) |
| 8 | Non-GBR | 8 | 300 | $10^{-6}$ | TCP based data (e.g., email, internet), FTP, P2P file sharing, etc. |
| 9 | Non-GBR | 9 | 300 | $10^{-6}$ | |

FIG. 7

UPLINK CHANNEL RESERVATION WITH CONFLICTING WIRELESS COMMUNICATIONS

CROSS REFERENCE TO RELATED APPLICATIONS

This patent application is a continuation of U.S. patent application Ser. No. 15/154,960, filed May 14, 2016, which application claims priority to, and thus the benefit of an earlier filing date from, U.S. Provisional Patent Application No. 62/161,443 (filed May 14, 2015), the entire contents of which are both hereby incorporated by reference.

BACKGROUND

Cellular telephony continues to evolve at a rapid pace. Cellular telephone networks currently exist in a variety of forms and operate using a variety of modulations, signaling techniques, and protocols, such as those found in 3G and LTE networks (3rd Generation of mobile telecommunications technology and Long Term Evolution, respectively). As consumers require more capacity, the networks usually evolve. For example, some carriers, or Mobile Network Operators (MNOs), employ a combination of 3G and the faster LTE because MNOs needed faster networks to satiate the increased demand for data and voice.

Moreover, efforts exist to implement these technologies in radio frequency (RF) bands that comprise conflicting communications. For example, there has been accelerated development of LTE in unlicensed bands (a.k.a. LTE-U and Licensed-Assisted-Access, or "LAA-LTE") where WiFi has traditionally been implemented. Unlike LTE, however, WiFi employs a method of Listen Before Talk (LBT) to ensure that WiFi systems do not interfere with one another. If LTE were to also employ LBT, it would decrease the ability of user equipment ("UEs", such as cellphones and other mobile devices) to make uplink (UL) transmissions.

SUMMARY

Systems and methods presented herein provide for channel reservation for a wireless telephony system operating in an RF band with a wireless system comprising a conflicting wireless technology. In one embodiment, a method is operable with an eNodeB operating in an RF band comprising a conflicting wireless technology. The method includes assigning an ID (e.g., a pseudorandom number, or "PN") to a user equipment (UE) operating in the RF band, processing a scheduling request for uplink (UL) data from the UE, and granting a time and a frequency for the UE to transmit the UL data. The method also includes waiting until the UE performs a Listen Before Talk (LBT) operation to determine whether the granted time and frequency is occupied by another wireless system employing a different wireless technology. The method also includes transmitting the ID to the UE to reserve the granted time and frequency when unoccupied by the other wireless system, and processing the UL data from the UE.

In another embodiment, a method is operable in a UE. The method includes processing an ID (e.g., a PN) assigned by an eNodeB, transmitting a scheduling request to the eNodeB for uplink (UL) data from the UE, and processing a time and frequency grant from the eNodeB for the UE to transmit the UL data. The method also includes waiting until the granted time and frequency are clear of another wireless system employing a different wireless technology operating in the RF band, and, when the granted time and frequency are clear, transmitting the UL data to the eNodeB.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

FIG. 7 is an exemplary table of the QoS Class Identifiers.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
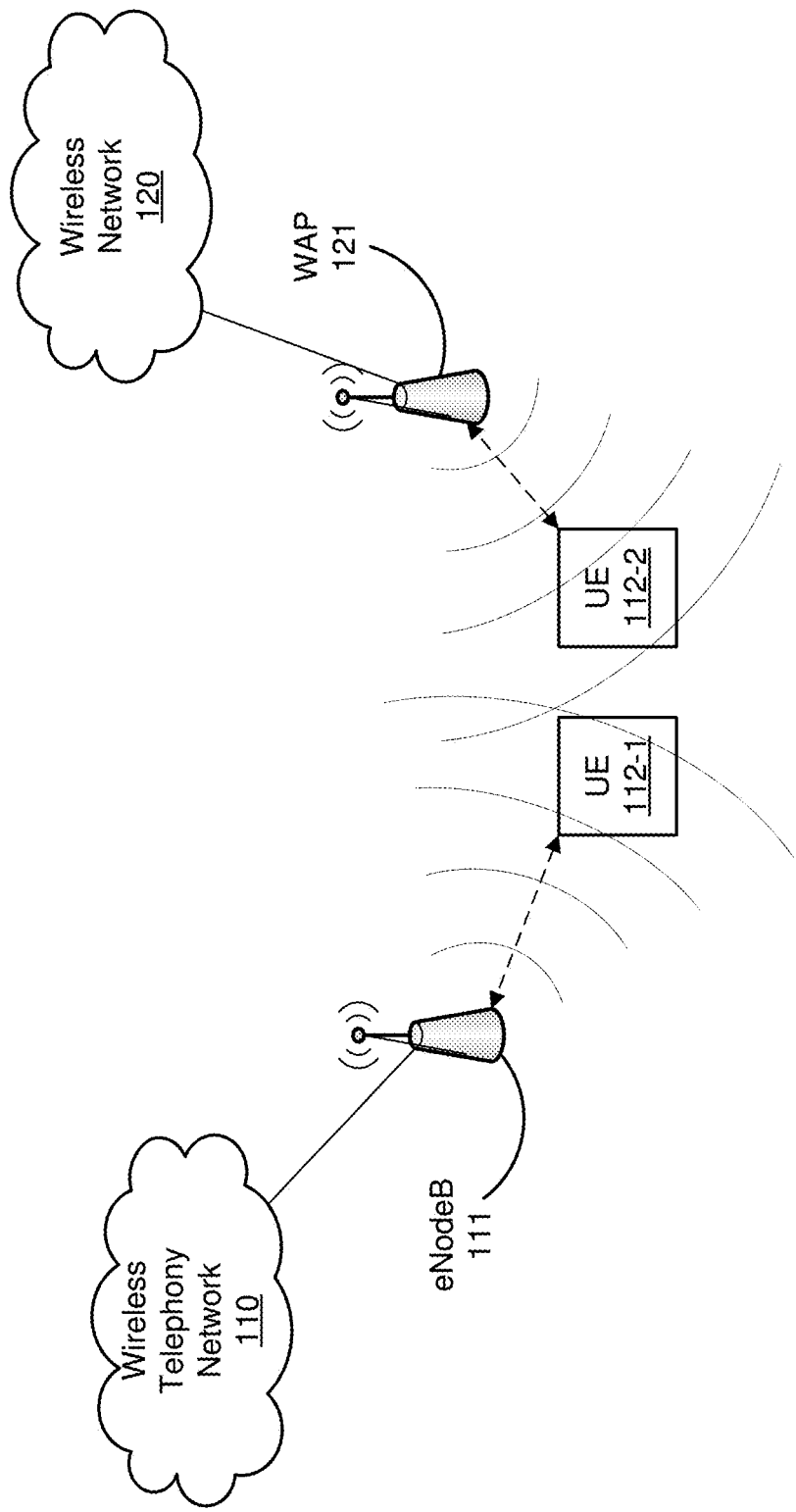
FIG. 1 is a block diagram of an exemplary wireless telecommunications system operating in an RF band with a conflicting wireless system.

FIG. 1 is a block diagram of an exemplary wireless telecommunications system operating in an RF band with a conflicting wireless system. The wireless telecommunications system comprises an eNodeB 111 communicatively coupled to a wireless telephony network 110. Generally, the eNodeB 111 is any system, apparatus, software, or combination thereof operable to maintain or otherwise support wireless communications, including data and voice, with subscribers via their UEs 112 (e.g., mobile handsets and other wireless devices). In this regard, the eNodeB 111 may implement the wireless communications of the wireless telephony network 110 over RF via, for example, 2G, 3G, LTE, or the like.

The conflicting wireless system comprises wireless access point (WAP) 121 communicatively coupled to the wireless network 120. The wireless system of the WAP 121 conflicts with the wireless telecommunications system of the eNodeB 111 as the wireless system of the WAP 121 uses a form of wireless technology that is incompatible with the communication protocols of the wireless telecommunications system of the eNodeB 111. Thus, communications between the UE 112-2 and the WAP 121 can interfere with the communications between the UE 112-1 and the eNodeB 111.

To illustrate, the eNodeB 111 may be part of an LTE wireless telephony network, whereas the WAP 121 may be part of a WiFi network (e.g., a WiFi hotspot or a personal WiFi router). Generally, this means that the eNodeB 111 is operating in an unlicensed band of RF, such as the industrial, scientific, and medical (ISM) band, where WiFi communications have flourished. Because these bands are so cluttered with WiFi communications, WiFi devices (e.g., the UE 112-2) employ LBT to ensure that they do not interfere with one another when operating via WiFi. LTE communications, however, tend to occupy an entire band of frequencies at any given time to ensure that their communications between their UEs 112 can be sustained. Thus, at the very least, an LTE wireless telephony network will interfere with other communication systems in the band. So, to be more "friendly" with other wireless systems in an unlicensed band, the embodiments herein provide for LBT operations between the UE 112-1 and an eNodeB 111 of a wireless telephony network 110.

The media access control (MAC) of LTE uses a centralized scheduler where the eNodeB 111 schedules UL and downlink (DL) traffic. LBT generally does not present problems on LTE DL transmissions because the eNodeB 112 transmits when it has successfully contended for a channel. UL transmissions, however, are scheduled at precise instances of time and frequency. And, LBT disrupts the timing of the scheduled UL transmissions.

In LTE, the UE 112-1 transmits when the UE 112-1 has been granted a time and frequency by the eNodeB 111. To be granted a time and frequency by the eNodeB 111, the UE 112-1 schedules a request for a UL data transmission, which may be done in various ways. For example, the UE 112-1 may send a one bit indicator in a Scheduling Request (SR) when it needs UL shared channel (SCH) resources. Alternatively or additionally, the UE 112-1 may transmit a Buffer Status Report (BSR) when the UE 112-1 already has a valid scheduling grant so as to indicate its queue depth with the BSR. Generally, the BSR is sent as part of the MAC header in the payload such that the UE 112-1 can "piggyback" on the BSR when using the UL resource.

However, in the unlicensed RF band, the UE 112-1 needs to perform LBT before each UL transmission because the channel may not be clear at the time of its scheduled transmission. LBT increases the uncertainty of when the UE will get to transmit, and therefore increases the delay incurred on the UL data. When the UE 112-1 successfully contends for the channel to transmit its data, the data may have already passed a delay budget based on the LTE protocols and is discarded.

After the eNodeB 111 receives the SR, the eNodeB 111 starts a timer that keeps track of the elapsed time from the channel frequency/time grant resulting from the SR. When the timer elapsed passes a threshold delay, the eNodeB 111 starts monitoring the channel for the UE. When the channel has cleared, the eNodeB 111 reserves the channel on behalf of the UE 112-1 by broadcasting a UE-specific ID with a higher power to reserve the channel. Upon receiving the ID, the UE 112-1 immediately transmits its data. In one embodiment, the UE-specific ID is a pseudorandom number (PN) sequence already assigned to each UE used mainly during UE handover. This channel reservation can also be implemented by piggybacking its indication of UL data on the BSR of the LTE protocol.

Figure 2:
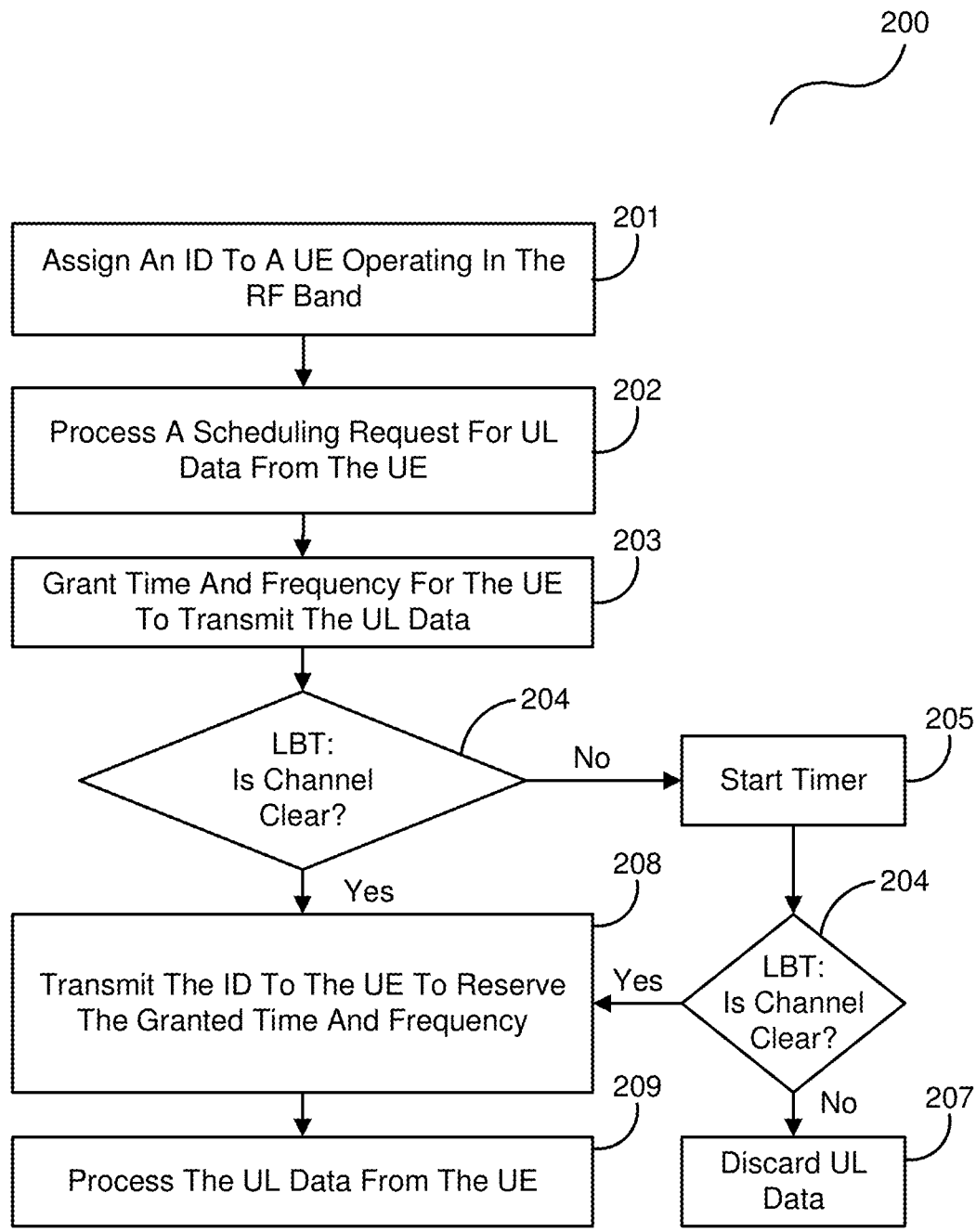
FIG. 2 is a flowchart illustrating an exemplary process operable with the eNodeB in the wireless telecommunications system.

With this in mind, FIG. 2 is a flowchart illustrating an exemplary process 200 operable with the wireless telecommunications system employing the eNodeB 111. In this embodiment, the eNodeB 111 assigns an ID to the UE 112-1 operating in the RF band of the eNodeB 111, in the process element 201. When the UE 112-1 needs to transmit UL data to the eNodeB 111, the UE 112-1 transmits an SR for UL data. In this regard, the eNodeB 111 processes the SR for UL data from the UE 112-1, in the process element 202. Based on a priority of the UL data, the eNodeB 111 grants a time and frequency for the UE 112-1 to transmit its UL data to the eNodeB 111, in the process element 203.

In the process element 204, the UE 112-1 performs an LBT operation determine whether the channel (i.e., at the granted time and frequency) is clear. If the channel is clear, the eNodeB 111 transmits the assigned ID to the UE 112-1 to reserve the granted time and frequency for the UE 112-1 to transmit its UL data, in the process element 208. The eNodeB 111 then processes the UL data from the UE 112-1, in the process element 209.

If the channel is not clear, the eNodeB 111 starts a timer, in the process element 205, such that the UE 112-1 can perform an LBT before it transmits its UL data to the eNodeB 111. If the channel is clear, the eNodeB 111 transmits the assigned ID to the UE 112-1, in the process element 208. Otherwise, the UL data is discarded, in the process element 207. For example, the UL data may include high-priority voice data. However, the packetized UL data may include a relatively small portion of speech in the UL communications to the eNodeB 111. Accordingly, if a channel cannot be reserved before the timer expires, the packetized data containing the speech may be dropped as it is no longer fresh, resulting in a negligible amount of lost speech.

Figure 3:
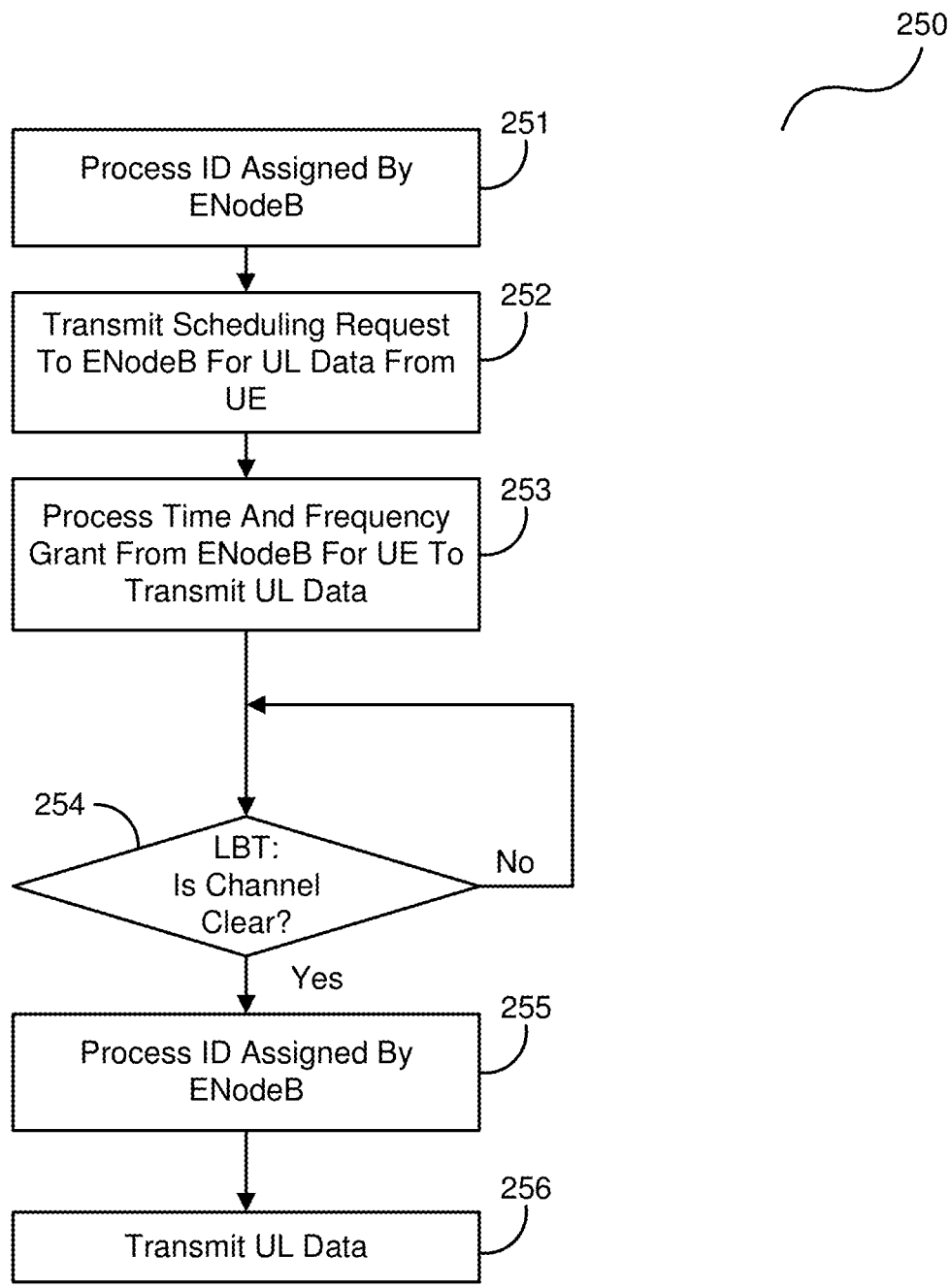
FIG. 3 is a flowchart illustrating an exemplary process operable with the UE in the wireless telecommunications system.

FIG. 3 is a flowchart illustrating another exemplary process 250 operable with the wireless telecommunications system. In this embodiment, the process 250 is illustrated with respect to the UE 112-1. Thus, the process 250 initiates with the UE 112-1 processing the ID assigned by the eNodeB 111, in the process element 251. The UE 112-1 transmits the SR to the eNodeB 111 for scheduling transmission of its UL data, in the process element 252. Once the eNodeB 111 grants a time and frequency for its UL data of the UE 112-1, the UE 112-1 processes the time and frequency grant from the eNodeB 111, in the process element 253. The UE 112-1 then performs an LBT operation to determine whether the channel is clear, in the process element 254.

Once the channel clears, the UE 112-1 processes the ID assigned by the eNodeB, in the process element 255. For example, after the UE 112-1 determines that the channel is clear of conflicting wireless technologies, the eNodeB 111 transmits the ID to the UE 112-1 to reserve the channel for the UE 112-1. The UE 112 then transmits the UL data to the eNodeB 111, in the process element 256.

Figure 4:
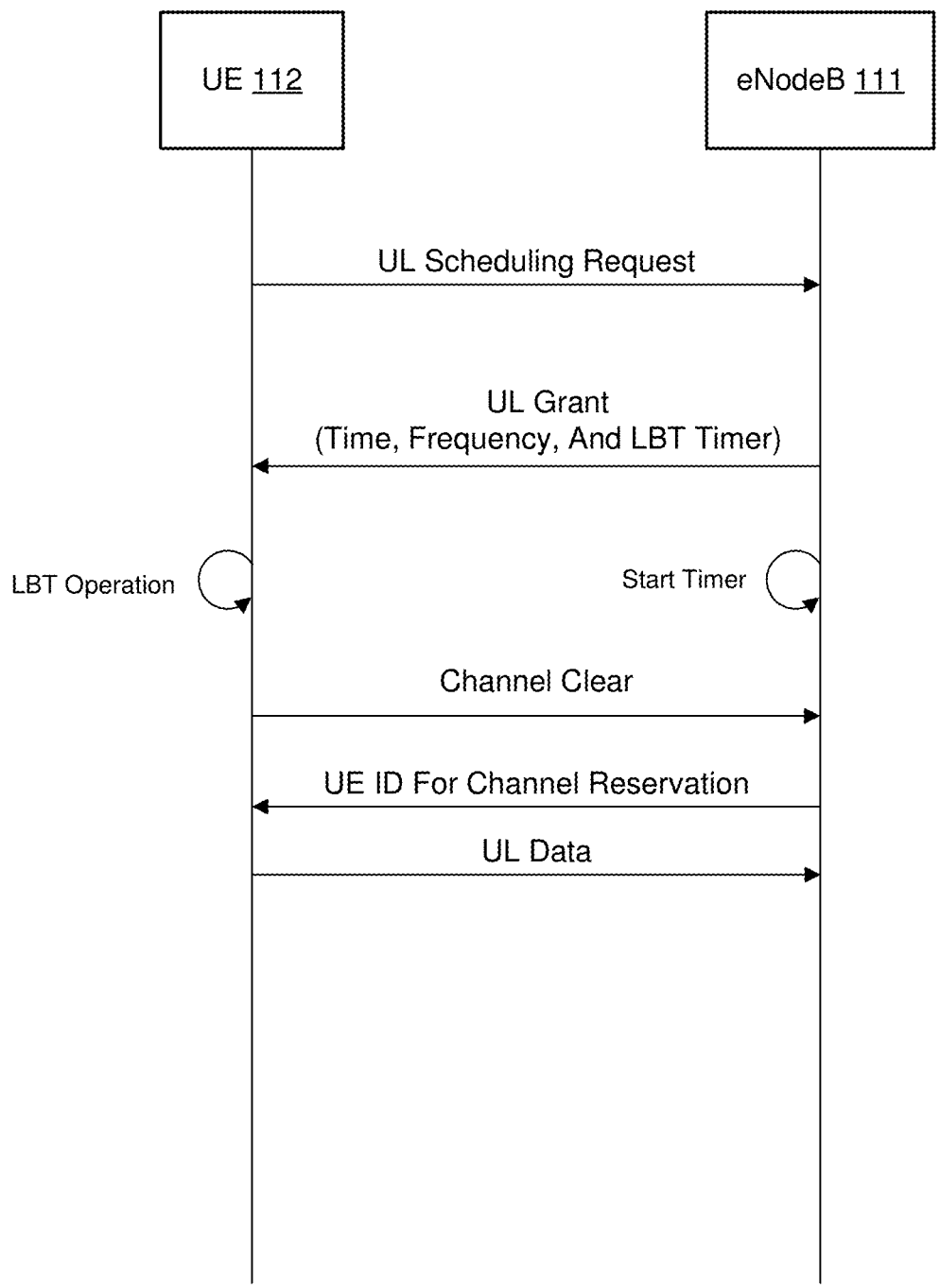
FIG. 4 is an exemplary messaging diagram between a UE and an eNodeB in the wireless telecommunications system.

FIG. 4 is an exemplary messaging diagram between a UE 112 and an eNodeB 111 in the wireless telecommunications system. Again, the UE 112 sends an SR to the eNodeB 111 for scheduling transmission of the UL data. The eNodeB 111, in turn, responds with a UL data transmission grant with a designated time and frequency. The eNodeB 111 then starts a timer and while the UE 112-1 performs the LBT operation. The UL grant may also include the LBT timer which lets the UE 112 know how long it has to determine whether the granted channel is clear of communications from another conflicting wireless system. Once the channel clears and the timer is not expired, the eNodeB 111 transmits the assigned ID for channel reservation such that the UE 112 can transmit its UL data.

Figure 5:
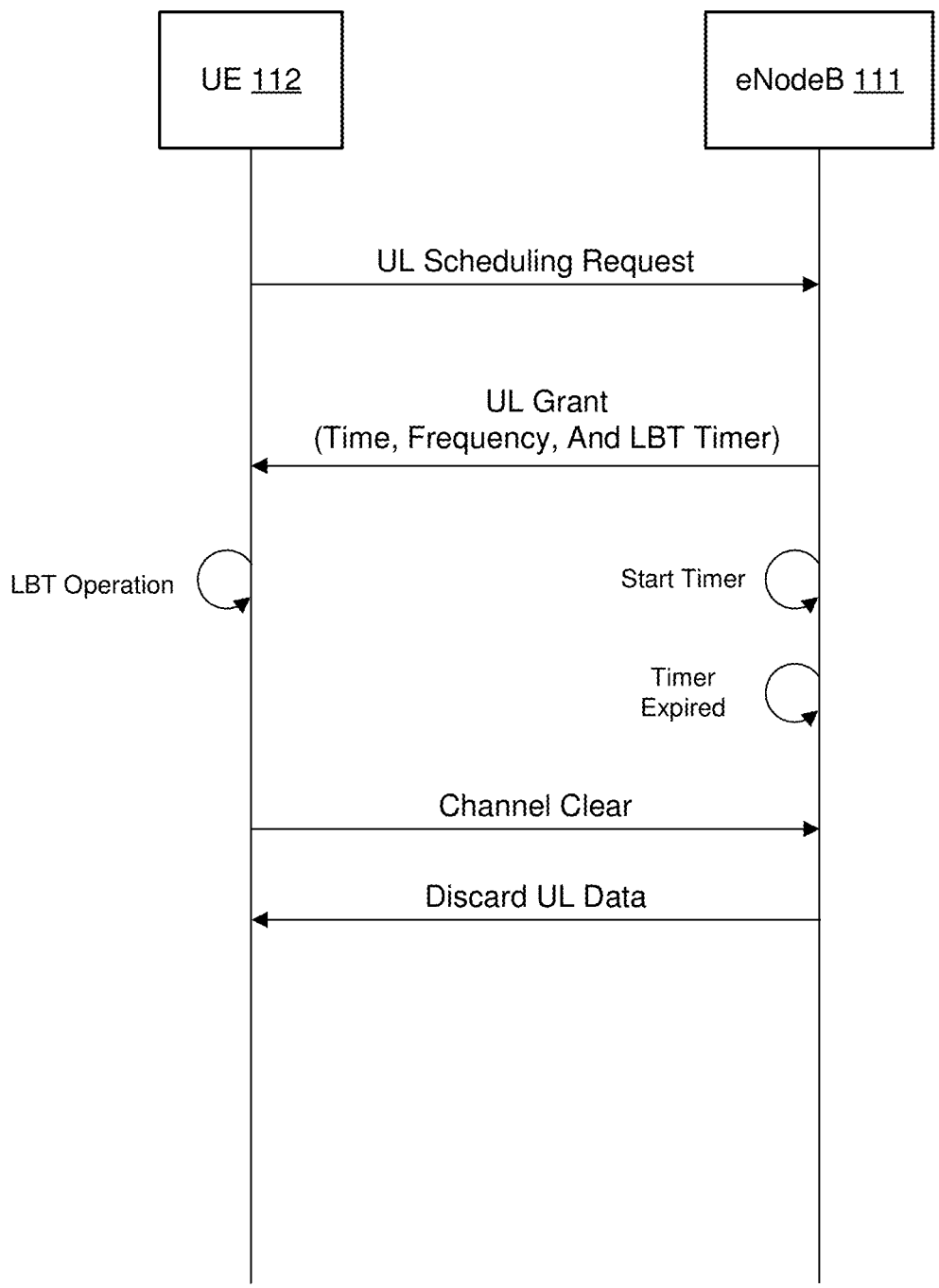
FIG. 5 is another exemplary messaging diagram between a UE and an eNodeB in the wireless telecommunications system.

FIG. 5 is a messaging diagram between an UE 112 and an eNodeB 111. In this embodiment, the timer established by the eNodeB 111 expires before the channel clears. Thus, even after the UE 112 performs the LBT operation and determines that the channel is clear, the eNodeB 111 directs the UE 112 to discard the UL data as it is now stale.

In one embodiment, the timer is a dynamically assigned by the eNodeB 111 based on a QOS for the UE 112-1. For example, a UL scheduler of the eNodeB 111 in LTE communications traditionally schedules UL data transmissions based on current loading of eNodeB 111, capability of the UE 112-1, cell capacity of the eNodeB 111, interference, resource block (RB) utilization at neighboring cells, etc. While those factors are still considered, in this embodiment, the eNodeB 111 establishes and updates the timer for each UE 112 communicating with the eNodeB 111 based on their various traffic flows (a.k.a. bearer traffic). To illustrate, each type of bearer traffic may have an associated QOS Class identifier (QCI) that takes into consideration factors such as delay, jitter, guaranteed bit rate (GBR), non-GBR, etc. And, each UE 112 may have multiple forms of air traffic to transmit to the eNodeB 111. Examples of these QCIs are illustrated in the table 280 of FIG. 7.

Figure 6:
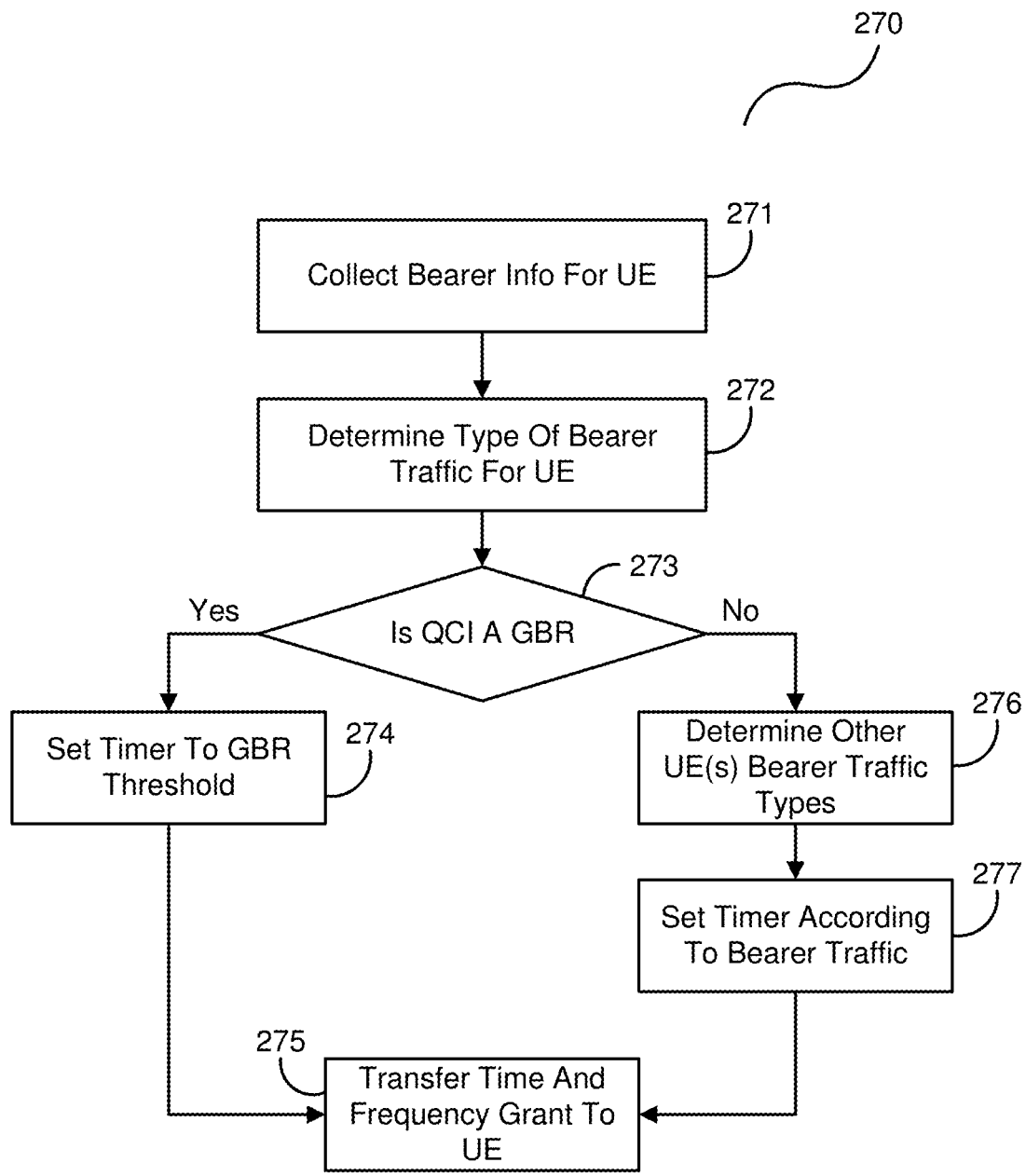
FIG. 6 is a flowchart illustrating another exemplary process operable with the wireless telecommunications system for determining an LBT timer based on Quality of Service (QoS) Class Identifiers.

The eNodeB 111, in this regard, collects the bearer info for a UE 112, in the process element 271, and determines the type of bearer traffic for the UE 112, in the process element 272, as illustrated in FIG. 6. The eNodeB 111 then determines whether the QCI of the bearer traffic being presented to the eNodeB 111 (e.g., through an SR to the eNodeB 111) has a GBR, in the process element 273. If the bearer traffic has a GBR, then the eNodeB 111 sets the timer to a GBR threshold, in the process element 274. Generally, this means that the bearer traffic is high-priority UL data, such as conversational voice. Accordingly, the timer should be set to some minimal amount (e.g., as a matter of design choice) so as to quickly discard the UL data when it becomes stale in the event that the channel is not clear. The eNodeB 111 then transfers the time and frequency grant to the UE 111, in the process element 275, such that the UE 112 can perform the LBT operation to determine whether the channel is clear, as described above.

If the bearer traffic does not have a GBR, then the eNodeB 111 determines other types of bearer traffic presented from other UEs 112 currently assigned to the eNodeB 111, in the process element 276. With this information, the eNodeB 111 establishes a timer according to the bearer traffic of the other UEs 112, in the process element 277. For example, the types of bearer traffic that do not have a GBR may include non-conversational video (e.g., buffered streaming video) where the UL data can be saved/stored and transmitted over time as the delivery of that data is not time sensitive. The eNodeB 111 may collect information from the other UEs 112 having bearer traffic to determine an aggregate QCI and arrive at a timer based on that aggregate QCI. Once the timer has been computed, the eNodeB 111 transfers the time and frequency grant to the UE 111 (and other UEs 112 with bearer traffic assigned to the eNodeB 111), in the process element 275.

Additionally, when a UE 112-1 has multiple bearers (i.e., multiple types of UL traffic), the UE 112-1 makes its own decisions on which bearer traffic to transmit first upon receiving a grant. In this regard, the UE 112-1 prioritizes its traffic to transmit its most delay sensitive traffic first. This is the reason for setting the timer to the delay budget of the QCI with a stringent delay requirement among all of the traffic bearers of the UE 112-1. But, when the UE 112 has only non-GBR bearers (e.g., non-time sensitive traffic), the eNodeB 111 can set the timer to the system load by adjusting it according to, for example, a 95th percentile delay of all the traffic bearers that the eNodeB 111 serves to improve the QOS for the users The MAC layer of the UE 112 is an intelligent entity that controls logical channel multiplexing. Above the MAC layer is the Radio Link Control (RLC) layer, where the traffic from different service bearers are segregated. In many cases, the MAC layer of the UE 112 commands the RLC to pull from each logical channel buffer based on various rules, including QOS requirements of the bearer.

For example, during initial deployments of LTE, multiple bearers, particularly those with different QCIs, were not widely used. However, as users of the UEs 112 have more applications and more types of data, multiple bearers need to be provisioned. And, as LTE moves into the unlicensed spectrum with implementations of LBT, the UE 112 can no longer be in complete control of scheduling its own transmissions because if a UE 112 schedules its UL data transmission based on the priority of the bearer, higher priority bearers will always get served first, and lower priority, non-GBR bearers may be "starved" of transmission resources.

In these embodiments, the UE 112 now contends for a channel prior to transmission. Accordingly, in one embodiment, non-GBR traffic is sent first with the possibility of discarding GBR traffic altogether, as some GBR traffic can afford to miss transmissions. For example, a packet of voice conversation data that is dropped will generally only result in a negligible amount of lost speech.

To prioritize the data at the UE 112, the embodiments herein provide for a 2-bit priority indicator field added to the SR that indicates whether the SR has high priority data, low priority data, or a combination thereof. This allows the eNodeB 111 to gain a granular control of the UE 112s scheduling mechanism. When the UE 112 has indicated both high and low priority traffic in the SR, but the eNodeB 111 has only indicated low priority traffic in the grant, this is an indication that the high priority traffic has passed (e.g., the timer has expired) such that the UL data can be discarded by the UE 112.

Figure 8:
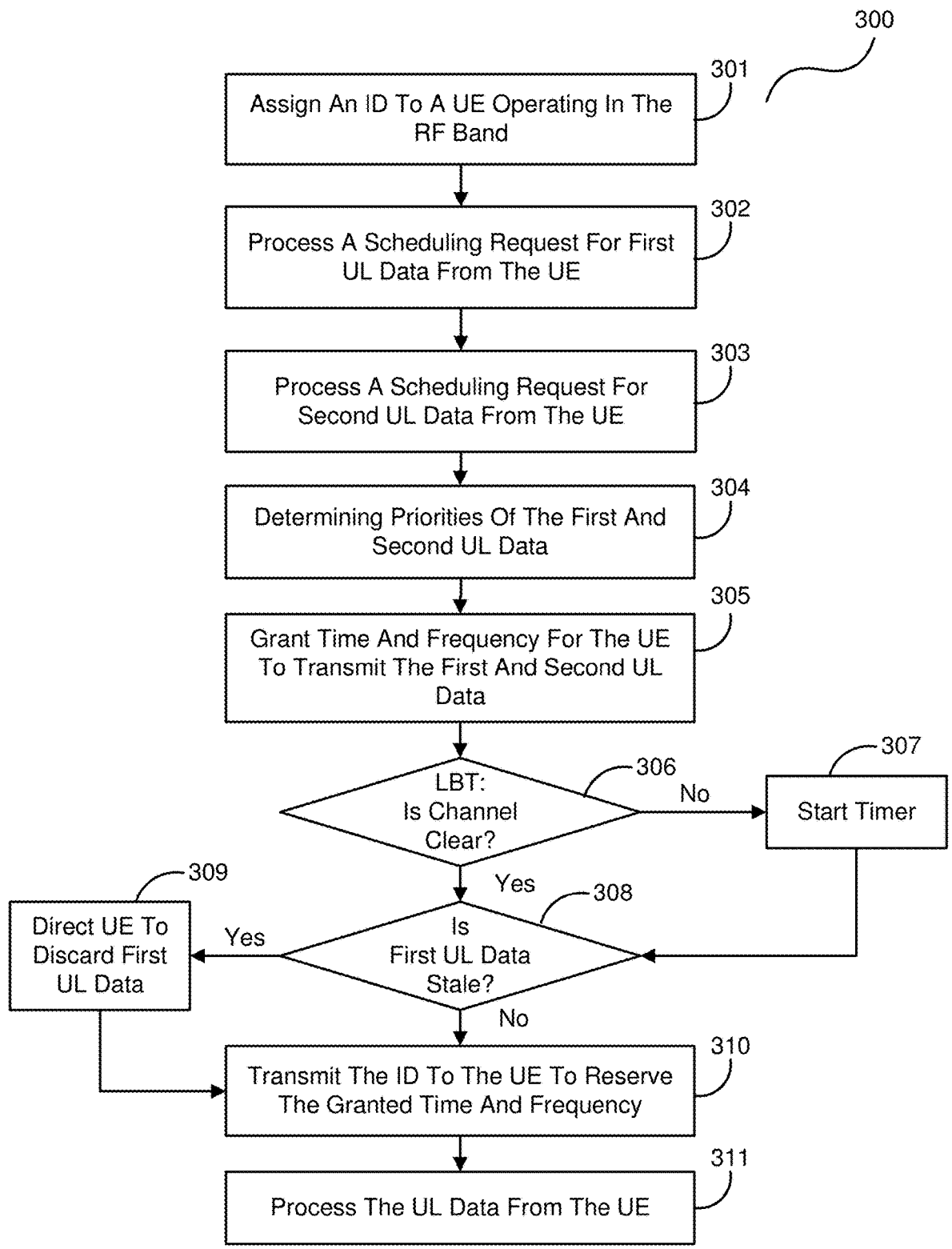
FIG. 8 is a flowchart of an exemplary process operable with the eNodeB in the wireless telecommunications system.
Figure 9:
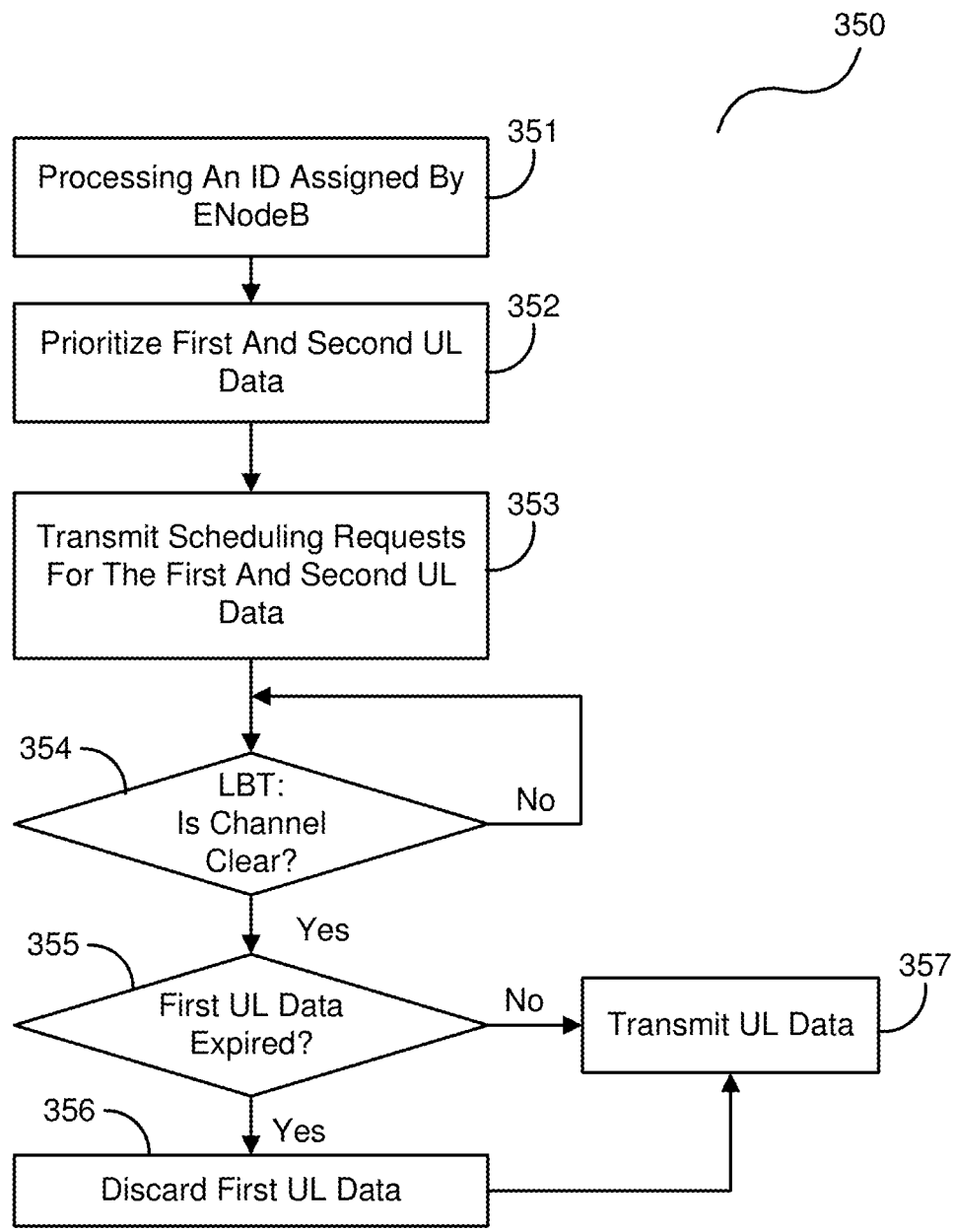
FIG. 9 is a flowchart of another exemplary process operable with the UE in the wireless telecommunications system.

With this in mind, FIGS. 8 and 9 illustrate two exemplary processes of the wireless telecommunications system. More specifically, FIG. 8 is a flowchart of an exemplary process 300 operable with the eNodeB in the wireless telecommunications system, whereas FIG. 9 is a flowchart of an exemplary process 350 operable with the UE in the wireless telecommunications system.

In FIG. 8, the process 300 initiates when the eNodeB 111 assigns an ID (e.g., a PN sequence) to the UE 112-1, in the process element 301. The eNodeB 111 then processes SRs for the first and second UL data, in the process elements 302 and 303. The eNodeB 111 then determines priorities of the first and second UL data, in the process element 304 and grants a time and frequency for the UE 112-1 to transmit the first and second UL data, in the process element 305.

The eNodeB 111 then waits for the channel to clear, in the process element 306. For example, eNodeB 111 may wait for the UE 112-1 to perform an LBT operation to determine whether the channel is unoccupied by a conflicting wireless technology. Alternatively or additionally, the eNodeB 111 may perform an LBT operation to determine whether the channel is unoccupied. In either case, the eNodeB 111 determines that the first UL data is higher priority data and starts a timer, in the process element 307, to determine whether the first UL data is stale, in the process element 308. Thus, once the channel clears and the first UL data is stale, the eNodeB 111 transmits the ID to the UE 112-1 to reserve the grand time and frequency for the UE 112-1 to transmit the second UL data, in the process element 310. The eNodeB 111 also directs the UE 112-1 to discard the first UL data, in the process element 309.

If, however, the channel is clear (i.e., the process element 306), the eNodeB 111 transmits the ID to the UE 112-1, in the process element 310, such that the UE 112-1 can transmit its UL data. In this regard, the timer generally does not start and the first UL data cannot be stale. And, the eNodeB 111 processes the first and second UL data from the UE 112-1, in the process element 311.

In FIG. 9, the process 350 initiates by the UE 112-1 processing the ID assigned by the eNodeB 111, in the process element 351. The UE 112-1 prioritizes the first and second UL data, in the process element 352, giving the first UL data higher priority than the second UL data. The UE 112-1 then transmits SRs for the first and second UL data, in the process element 353. Upon receiving the grants for time and frequency from the eNodeB 111, the UE 112-1 performs an LBT operation, in the process element 354, to determine whether the channel is clear.

Once the channel is clear, the UE 112-1 determines whether the first UL data has expired, in the process element 355. For example, the eNodeB 111 establishes a timer for the higher priority data such that it can be discarded by the UE 112-1 when that data becomes stale. If the first UL data has not expired, then the UE 112-1 transmits the first and second UL data to the eNodeB 111, in the process element 357. Otherwise, the UE 112-1 discards the first UL data, in the process element 356, and transmits the second UL data, in the process element 357.

Discarding of the first UL data may be at the direction of the eNodeB 111 or based on a timer maintained by the UE 112. In any case, the first UL data is discarded as it is no longer needed, as in the case with conversational voice dropping a packet of voice data that is negligible to the overall conversation.

Figure 10:
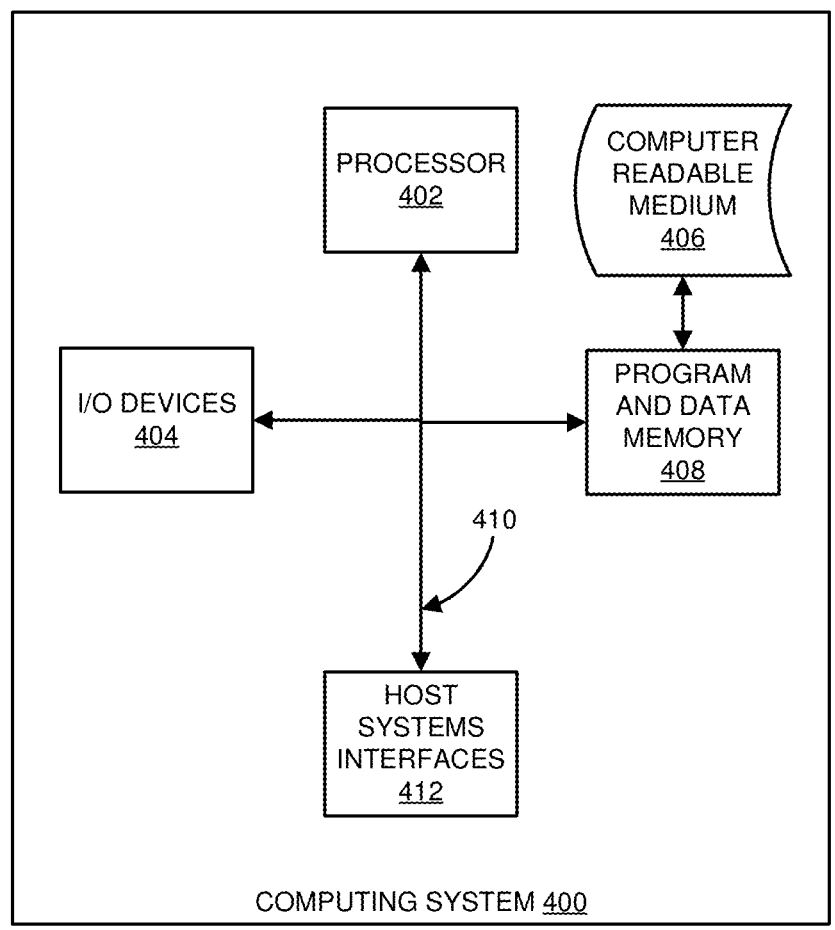
FIG. 10 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 10 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output or I/O devices 404 (including but not limited to keyboards, displays, pointing devices, etc.) can be coupled to the system either directly or through intervening I/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A method operable with a wireless base station operating in a radio frequency (RF) band, the method comprising:
    processing a scheduling request for uplink (UL) data from a user equipment (UE) operating in the RF band;
    granting a time and a frequency for the UE to transmit the UL data;
    in response to the granted time and frequency being occupied by an other wireless transmission, starting a timer of the wireless base station to allow the UE to perform a Listen Before Talk (LBT) operation to determine whether the granted time and frequency are still occupied by the other wireless transmission;
    reserving the granted time and frequency when unoccupied by the other transmission; and
    processing the UL data from the UE.

2. The method of claim 1, wherein:
    the other wireless transmission is a WiFi transmission.

3. The method of claim 1, further comprising:
    determining a quality of service (QoS) of the UE;
    determining a length of the timer based on the QoS; and
    dropping the UL data when the timer expires to process another scheduling request for UL data from the UE.

4. The method of claim 1, wherein:
    the wireless base station communicates to the UE via fifth generation (5G) communications.

5. The method of claim 1, wherein:
    the wireless base station communicates to the UE via fifth generation (5G) new radio (NR) communications.

6. The method of claim 1, further comprising:
    assigning an identifier (ID) to the UE, wherein the ID is a pseudorandom number sequence.

7. A wireless base station configured to operate in a radio frequency (RF) band, the wireless base station comprising:

a processor operable to process a scheduling request for uplink (UL) data from a user equipment (UE), to grant a time and a frequency for the UE to transmit the UL data, and to start a timer of the wireless base station in response to the granted time and frequency being occupied by an other wireless transmission, to allow the UE to perform a Listen Before Talk (LBT) operation to determine whether the granted time and frequency are still occupied by the other wireless transmission; and an interface operable to reserve the granted time and frequency when unoccupied by the other wireless transmission, and to receive the UL data from the UE on the granted time and frequency.

8. The wireless base station of claim 7, wherein:
the other wireless transmission is a WiFi transmission.

9. The wireless base station of claim 7, wherein:
the processor is further operable to determine a quality of service (QoS) of the UE, to determine a length of the timer based on the QoS, and to drop the UL data when the timer expires to process another scheduling request for UL data from the UE.

10. The wireless base station of claim 7, wherein:
the processor is further operable to determine a quality of service (QoS) of a traffic type, to determine a length of the timer based on the QoS, and to drop the UL data when the timer expires to process another scheduling request for UL data from the traffic type.

11. The wireless base station of claim 10, wherein:
the traffic type is a traffic type with a guaranteed bit rate (GBR).

12. The wireless base station of claim 11, wherein:
the GBR traffic is identified by a quality of service class identifier (QCI) classification.

13. The wireless base station of claim 7, wherein:
the wireless base station communicates to the UE via fifth generation (5G) communications.

14. The wireless base station of claim 7, wherein:
the wireless base station communicates to the UE via fifth generation (5G) new radio (NR) communications.

15. The wireless base station of claim 7, further comprising:
assigning an identifier (ID) to the UE, wherein the ID is a pseudorandom number sequence.

16. A wireless base station configured to operate in a radio frequency (RF) band, the wireless base station comprising:
a processor operable to determine a quality of service (QoS) of a user equipment (UE), to establish a timer for uplink (UL) data based on the QoS, and to drop the UL data when the timer expires to process another scheduling request for UL data from the UE; and an interface operable to transmit a time and frequency grant to the UE, to reserve the granted time and frequency when unoccupied by an other wireless transmission, and to receive the UL data from the UE at the granted time and frequency.

* * * * *